United States Patent [19]
Ueno et al.

[11] Patent Number: 6,002,287
[45] Date of Patent: Dec. 14, 1999

[54] SIGNAL OUTPUTTING APPARATUS

[75] Inventors: Isamu Ueno, Hadano; Toru Koizumi, Yokohama, both of Japan

[73] Assignee: Canon Kabushiki Kaisha, Tokyo, Japan

[21] Appl. No.: 09/072,179

[22] Filed: May 5, 1998

[30] Foreign Application Priority Data

May 8, 1997 [JP] Japan .................................. 9-118026

[51] Int. Cl.⁶ .................................................. G06G 7/12
[52] U.S. Cl. ........................................ 327/307; 327/362
[58] Field of Search .................................. 327/307, 362, 327/363, 564, 565, 566

[56] References Cited

U.S. PATENT DOCUMENTS

| | | | |
|---|---|---|---|
| 4,835,404 | 5/1989 | Sugawa et al. | 250/578 |
| 4,879,470 | 11/1989 | Sugawa et al. | 250/578 |
| 4,910,597 | 3/1990 | Harada et al. | 358/213.15 |
| 5,019,702 | 5/1991 | Ohzu et al. | 250/208.1 |
| 5,162,912 | 11/1992 | Ueno et al. | 358/213.16 |
| 5,182,447 | 1/1993 | Nakayama | 250/208.1 |
| 5,184,006 | 2/1993 | Ueno | 250/208.1 |
| 5,233,442 | 8/1993 | Kawai et al. | 358/482 |
| 5,262,870 | 11/1993 | Nakamura et al. | 358/212 |
| 5,311,320 | 5/1994 | Hashimoto | 348/243 |
| 5,331,421 | 7/1994 | Ohzu et al. | 340/262 |
| 5,397,944 | 3/1995 | DuPuis | 327/307 |
| 5,451,895 | 9/1995 | Lim | 327/351 |
| 5,539,196 | 7/1996 | Miyawaki et al. | 250/208.1 |
| 5,693,932 | 12/1997 | Ueno et al. | 250/208.1 |
| 5,714,752 | 2/1998 | Ueno et al. | 250/208.1 |

FOREIGN PATENT DOCUMENTS

| | | |
|---|---|---|
| 8-4127 | 4/1988 | Japan . |
| 4-113766 | 5/1992 | Japan . |
| 4-144362 | 5/1992 | Japan . |

*Primary Examiner*—Toan Tran
*Attorney, Agent, or Firm*—Fitzpatrick, Cella, Harper & Scinto

[57] ABSTRACT

In order to correct offset differences among chips, in a multi-chip signal outputting apparatus that connects a plurality of chips each having signal sources and output terminal, output signals from the signal sources of the chips are output via a correct circuit in the output circuit stage of at least one of the chips.

21 Claims, 14 Drawing Sheets

SIGNAL OUTPUTTING APPARATUS

BACKGROUND OF THE INVENTION

1. Field of the Invention

The present invention relates to a signal outputting apparatus suitably used in an image reading apparatus such as an image reader.

2. Related Background Art

A signal outputting apparatus for receiving output signals from a large number of signal sources, time-serially re-arranging or amplifying them, and outputting the re-arranged or amplified signals, often comprises a plurality of integrated circuit chips when the number of signal sources becomes very large.

As an example of a signal outputting apparatus having a plurality of integrated circuit chips, a multi-chip type image sensor is known.

The multi-chip type image sensor is an equal-magnification image sensing unit obtained by adhering a plurality of solid-state image sensor chips on a substrate, and is used in various products such as a facsimile apparatus, scanner, image reader, and the like.

FIG. 13 shows the equivalent circuit of the signal outputting apparatus. The apparatus shown in FIG. 13 comprises three image sensor chips 1 to 3, the output terminals of which are connected to a single output line. Assume that each chip is a linear sensor having two pixels in FIG. 13, for the sake of simplicity. Since these chips have the same configuration, the chip 1 will be exemplified below. The chip 1 comprises photoelectric conversion elements P1 and P2, signal holding capacitors C1 and C2, switch means M1 and M3 inserted between the photoelectric conversion elements and holding capacitors, switch means M2 and M4 inserted between the holding capacitors and an output line L1, a reset means M5 for resetting the output line L1 in the chip, an amplifier means A1, a buffer means B1, and a switch means SW1 inserted between the buffer means and unit output line.

The operation of the unit will be briefly described below. The individual chips simultaneously start photoelectric conversion (photocarrier accumulation), and simultaneously receive ON pulses at terminals TR1 to TR3 after an elapse of a predetermined period of time. In response to the ON pulses, optical signal outputs accumulated on the photoelectric conversion elements P1 to P6 of the three chips are respectively read out to the holding capacitors C1 to C6, thus ending the accumulation.

When scanning circuits operate to time-serially read out signals in the capacitors C1 and C2 first, these signals are voltage-amplified by the amplifier means A1, and the amplified signals are output from an output terminal 51 via the buffer means B1 and switch means SW1.

Upon completion of the output from the first chip, signals of the next chip begin to be output from a terminal 52. Upon completion of the output from the second chip, signals of the third chip are output from a terminal 53. In this way, signals output from the photoelectric conversion elements of the individual chips are sequentially output to a unit output terminal OUT.

The apparatus shown in FIG. 13 comprises the signal holding capacitors C1 and C2 in correspondence with the pixels (P1 and P2). However, in a recent technique disclosed in Japanese Patent Publication No. 8-4127, a plurality of holding capacitors are arranged for one pixel, and store a signal in the dark state of the pixel and an optical signal read out from that pixel. By obtaining a difference signal between these signals using a differential amplifier or the like arranged at the output side, a noise reduction of the signal can be attained.

However, in this signal outputting apparatus, when signals are output from the respective chips onto a common output line 54, the chips may often have different offset voltages between the signal outputs and reference voltage (e.g., ground potential GND).

FIG. 14 shows voltage waveforms for explaining the offset voltages generated in units of chips.

In FIG. 14, signals 55 and 56 are output from the photoelectric conversion elements P1 and P2 of the chip 1, signals 57 and 58 are output from the photoelectric conversion elements P3 and P4 of the chip 2, and signals 59 and 60 are output from the photoelectric conversion elements P5 and P6 of the chip 3.

Ideally, the reference output for the output signal from the chip 1, which serves as the reference potential GND, has a shift of an offset voltage Voff1 from the reference potential GND. Similarly, the chip 2 has a shift of an offset voltage Voff2, and the chip 3 a shift of an offset voltage Voff3.

Since these offset voltages are different from each other (Voff1≠Voff2≠Voff3), the output signals obtained from the photoelectric conversion elements P1 to P6 may become higher or lower than a predetermined value Vi even when the amount of light received remains the same.

Hence, even when the apparatus shown in FIG. 13 reads a solid black image, it may be read the image as a stripe image.

Such offset voltages are produced due to the offset voltages of the photoelectric conversion elements themselves, and the output offset voltages of the amplifier means and buffer means. Especially, the offset voltages produced by the photoelectric conversion elements and amplifier means become larger at the output terminal OUT as the amplifier means has a higher gain.

In the existing integrated circuit manufacturing processes, since the chips obtained have different characteristics albeit slightly, they often have different offset voltages.

SUMMARY OF THE INVENTION

It is an object of the present invention to provide a signal outputting apparatus which can reduce offset voltage differences among integrated circuit chips.

It is another object of the present invention to provide a signal outputting apparatus which can reduce offset voltage differences without any external memories corresponding to signal sources.

According to the present invention, in a signal outputting apparatus that connects a plurality of integrated circuit chips each having a plurality of signal sources and an output terminal for outputting output signals from the signal sources, at least one of the plurality of integrated circuit chips comprises a correct circuit for reducing a difference among offset voltages of the output signals from the integrated circuit chips.

DETAILED DESCRIPTION OF THE PREFERRED EMBODIMENTS

Figure 1A:
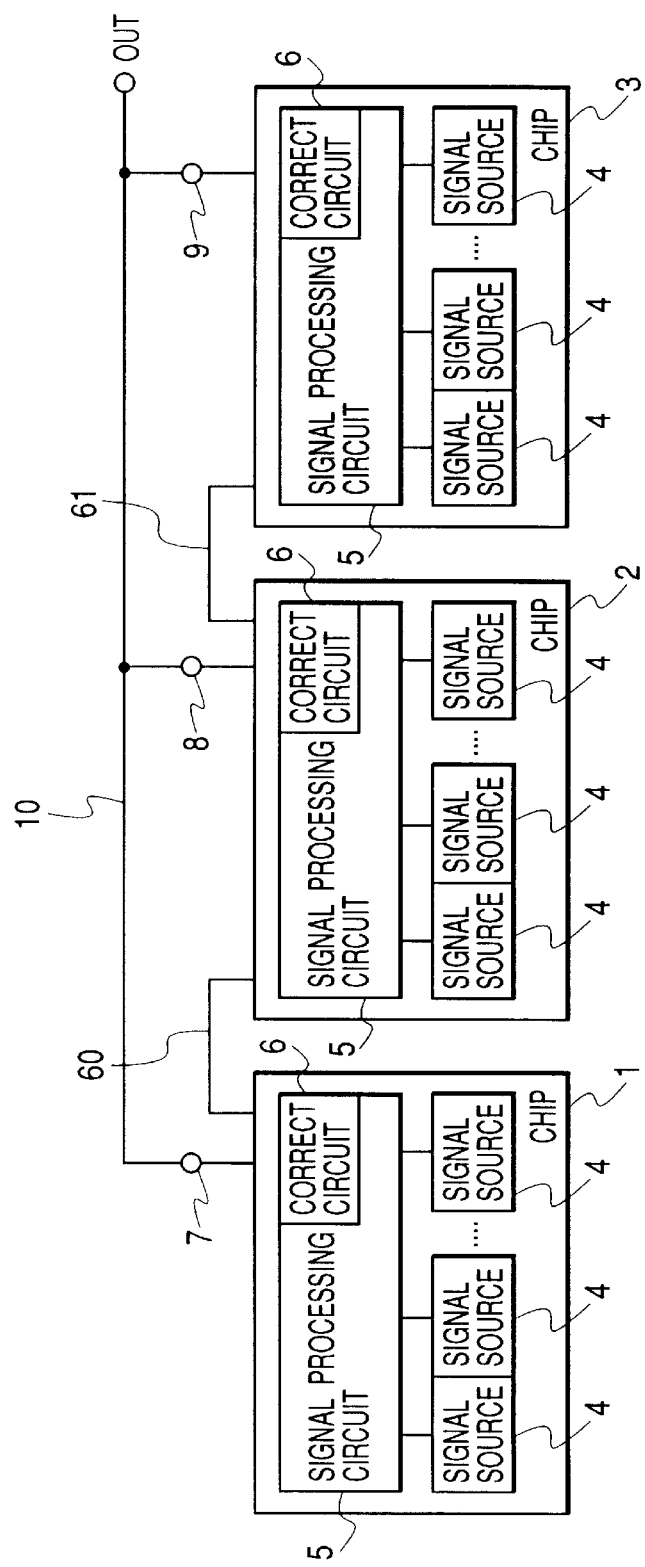
FIGS. 1A and 1B are respectively a diagram and chart showing the basic configuration of a signal processing apparatus of the present invention.
Figure 1B:
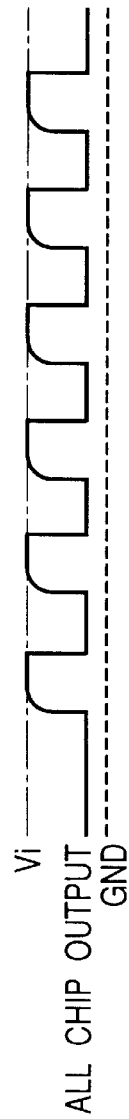

FIGS. 1A and 1B are views for explaining the basic configuration of a signal processing apparatus of the present invention. As shown in FIG. 1A, three integrated circuit chips 1, 2, and 3 respectively have a plurality of signal sources 4, and output terminals 7, 8, and 9, and are connected via a common output line 10 and lines 60 and 61 for inputting/outputting end/start signals, which are arranged as needed.

Each of the chips 1, 2, and 3 has a signal processing circuit 5 for amplifying or time-serially re-arranging output signals from the signal sources, and also has a correct circuit (offset canceler circuit) 6.

At least one of the three correct circuits 6 operates to reduce offset voltage differences among the output signals from the respective chips. Hence, the correct circuit 6 need only be arranged in at; least one of the three chips. However, since the manufacture of two different types of chips, i.e., chips with and without correct circuits 6, results in an increase in cost, it is preferable that identical chips with correct circuits be manufactured, and a correct circuit of at least one of these chips be operated by changing the wiring among chips (connections) or setting chip operations.

The operation of the signal processing apparatus shown in FIG. 1A is as follows.

The chip 1 operates to process output signals from the signal sources 4 by the signal processing circuit 5, and outputs the processed signals from the terminal 7.

Upon completion of the operation of the chip 1, an end/start signal indicating the end of operation of the chip 1 and the start of operation of the chip 2 is input to the chip 2 via the line 60. The correct circuit of the chip 2 receives offset voltage information of the chip 1 from the chip 1 via the terminals 7 and 8, and common output line 10. Hence, the output signals from the signal sources 4 of the chip 2 are corrected based on the offset voltage of the chip 1, and the corrected signals are output to the terminal 8.

Upon completion of the operation of the chip 2, an end/start signal is input to the chip 3 via the line 61. As in the chip 2, the output signals from the signal sources 4 of the chip 3 are corrected in accordance with the offset voltage information of the chip 1 input via the common output line 10, and the corrected signals are output from the terminal 9.

Figure 14:
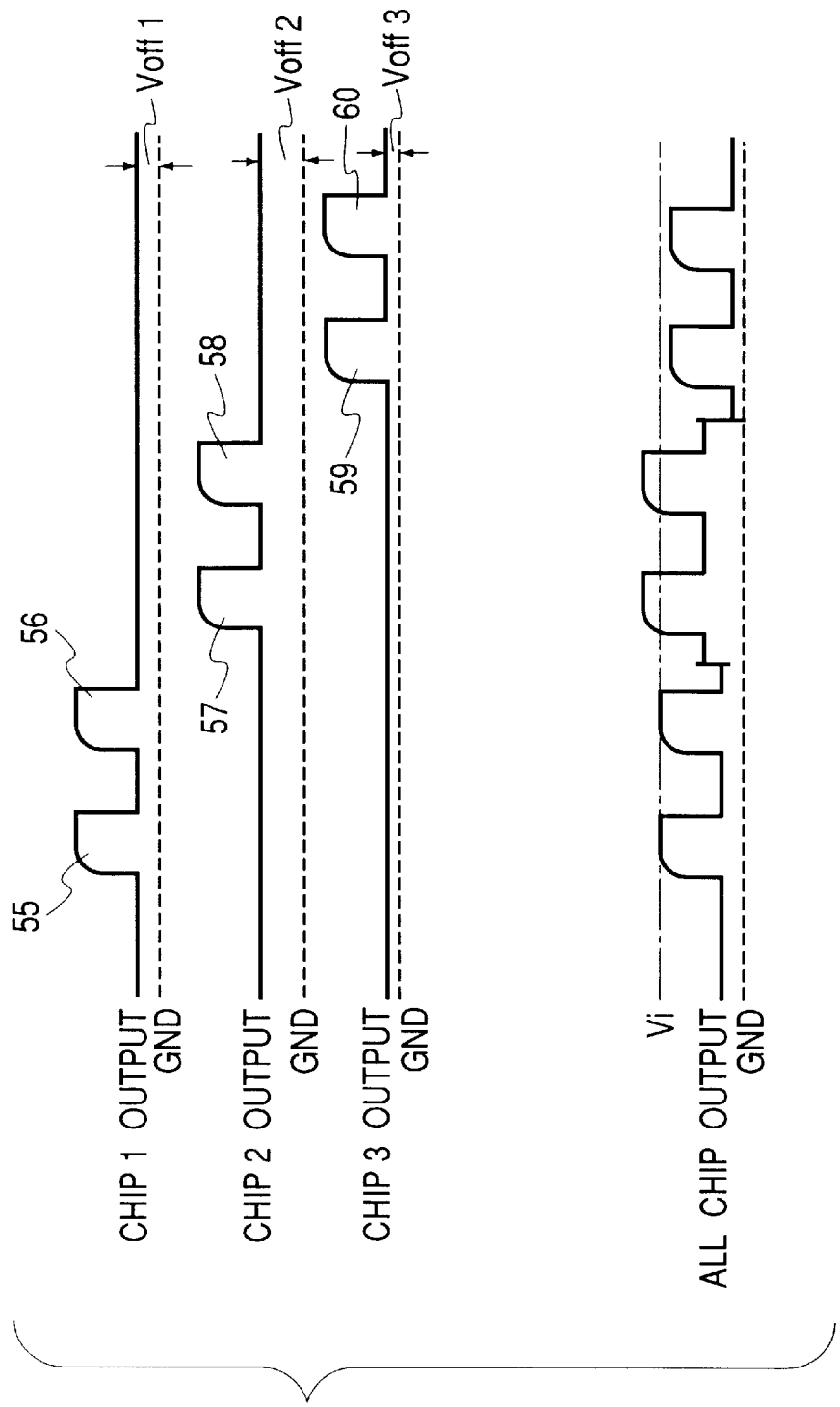
FIG. 14 is a timing chart for explaining the operation of the image sensor shown in FIG. 13.

Even when the chips have different offset voltages without any correction, as shown in FIG. 14, the signal processing apparatus of the present invention can obtain the output signals, as shown in FIG. 1B.

As can be seen from FIG. 1B, the offset voltage differences of the output signals from the respective chips are smaller than those in FIG. 14.

As the signal sources used in the present invention, photoelectric conversion elements, magnetic elements, thermoelectric conversion elements, mechano-electric conversion elements, and the like are known. Examples of the photoelectric conversion elements include photovoltaic elements such as photodiodes, phototransistors, and the like, photoconductive elements, and the like.

As the signal processing circuit 6 used in the present invention, a scanning (selection) circuit and amplifier represented by a shift register, decoder, multiplexer, CCD, and the like are known.

As the correct circuit (compensation circuit) used in the present invention, a circuit including a comparator or clamp circuit may be used, and its detailed configuration will be described later.

In the example shown in FIG. 1A, since the output signals are output onto the single common output line 10, the respective chips are driven time-serially to output the output signals to the terminal OUT. However, the respective chips may be simultaneously driven parallelly. In such case, the common output line need not be used, and the need for the lines 60 and 61 for transferring the end/start signals can be obviated.

In FIG. 1A, the respective chips are disposed in a linear array. Alternatively, these chips may be disposed in a checkerboard pattern, or four or more chips may be disposed in a two-dimensional matrix array.

Furthermore, preferably, each chip may additionally have a noise reduction circuit described in, e.g., Japanese Patent Publication No. 8-4127, to reduce variations (fixed pattern noise) among the signal sources.

As the integrated circuit chip of the present invention, integrated circuit elements formed using a semiconductor wafer such as Si, an insulating substrate such as glass, quartz, or the like, an SOI wafer, and the like are preferably used.

A plurality of integrated circuit chips are mounted on a glass substrate, ceramic substrate, plastic substrate, glass epoxy substrate, flexible film substrate, or the like, and are connected to each other via conductor wiring formed on such substrate.

The obtained assembly constitutes a signal outputting apparatus such as an image sensor or the like.

In the above-mentioned apparatus, the offset voltages of the chips 2 and 3 are corrected on the basis of the offset voltage of the output signals of the chip 1. Alternatively, by inputting the offset voltage of the chip 2 or 3 to other chips, the offset voltages of the other chips may be corrected.

The offset signal may be input from a certain chip to another chip upon power-ON of the signal outputting apparatus, at the beginning of operation of each chip, or at other arbitrary timings. For example, when the signal outputting apparatus is used as a linear image sensor, the offset signal may be input before the start of reading for one line, before the start of reading for one original, and so on. However, the offset signal input timing is not limited to these specific timings when the correct circuit uses a clamp circuit (to be described later) in place of a feedback system using a comparator.

The output signals obtained from the signal outputting apparatus of the present invention can have smaller offset voltage differences among the chips.

Hence, the offset voltage differences need not be corrected using external memories corresponding to the signal sources.

(First Embodiment)

Figure 2:
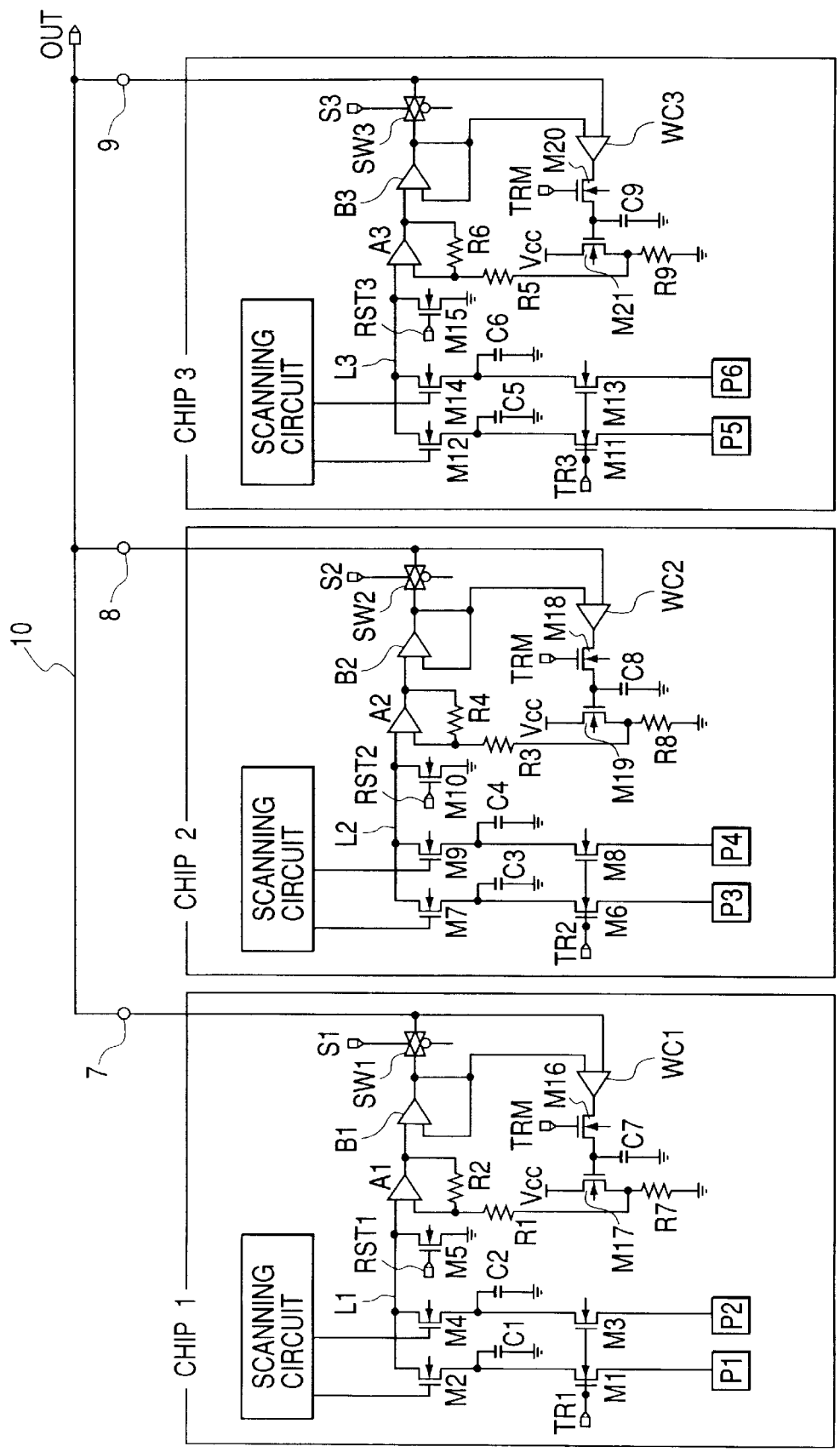
FIG. 2 is a circuit diagram showing the first embodiment of the present invention.

FIG. 2 shows the first embodiment of the present invention. The same reference numerals in FIG. 2 denote the same parts as in FIG. 13. The equivalent circuit of an image sensing unit as the signal outputting apparatus shown in FIG. 2 comprises at least three image sensor chips as in the configuration shown in FIG. 13, and the output terminals of chips 1 to 3 are connected to a single common output line 10. Each chip comprises a linear sensor having two pixels, for the sake of simplicity, but may have three or more pixels.

Figure 13:
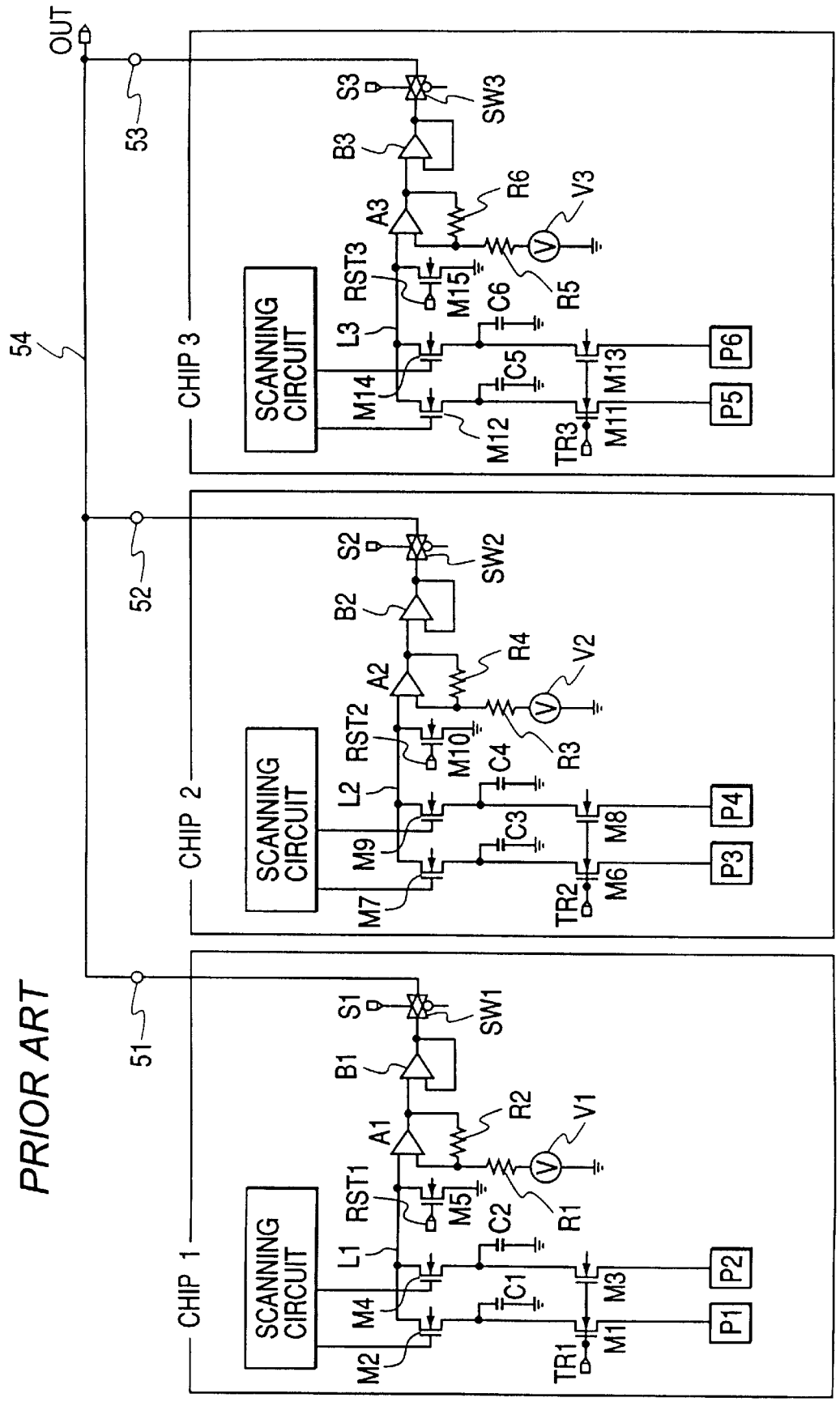
FIG. 13 is a circuit diagram showing the circuit of a conventional image sensor.

As shown in FIG. 2, the integrated circuit chip 1 comprises photoelectric conversion elements P1 and P2 as signal sources, signal holding capacitors C1 and C2, switch means M1 and M3 inserted between the photoelectric conversion elements and holding capacitors, switch means M2 and M4 inserted between the holding capacitors and an output line L1, a reset means M5 for resetting the output line L1 in the chip, an amplifier A1, a buffer means B1, a switch means SW1 inserted between the buffer means and unit output line, and a scanning circuit as a signal processing circuit, as in FIG. 13.

Similarly, the chip 2 comprises photoelectric conversion elements P3 and P4 as signal sources, signal holding capacitors C3 and C4, switch means M6 and M8 inserted between the photoelectric conversion elements and holding capacitors, switch means M7 and M9 inserted between the holding capacitors and an output line L2, a reset means M10 for resetting the output line L2 in the chip, an amplifier A2, a buffer means B2, a switch means SW2 inserted between the buffer means and unit output line, and a scanning circuit as a signal processing circuit.

Also, the chip 3 comprises photoelectric conversion elements P5 and P6 as signal sources, signal holding capacitors C5 and C6, switch means M11 and M13 inserted between the photoelectric conversion elements and holding capacitors, switch means M12 and M14 inserted between the holding capacitors and an output line L3, a reset means M15 for resetting the output line L3 in the chip, an amplifier A3, a buffer means B3, a switch means SW3 inserted between the buffer means and unit output line, and a scanning circuit as a signal processing circuit.

The operations until the photoelectric conversion elements P1, P2, P3, P4, P5, and P6 output signals onto the output lines L1, L2, and L3 in their chips are the same as those in the prior art described above with the aid of FIG. 13.

In this embodiment, the output circuit stage of the chip 1 comprises a comparator WC1 for comparing the output from the output buffer B1 and the unit output, switch means M16, a MOS transistor M17 that constitutes an amplifier together with a holding means C7, and a resistor R7. Similarly, the output circuit stage of the chip 2 comprises a comparator WC2 for comparing the output from the output buffer B2 and the unit output, switch means M18, a MOS transistor M19 that constitutes an amplifier together with a holding means C8, and a resistor R8. Also, the output circuit stage of the chip 3 comprises a comparator WC3 for comparing the output from the output buffer B3 and the unit output, switch means M20, a MOS transistor M21 that constitutes an amplifier together with a holding means C9, and a resistor R9.

Figure 3:
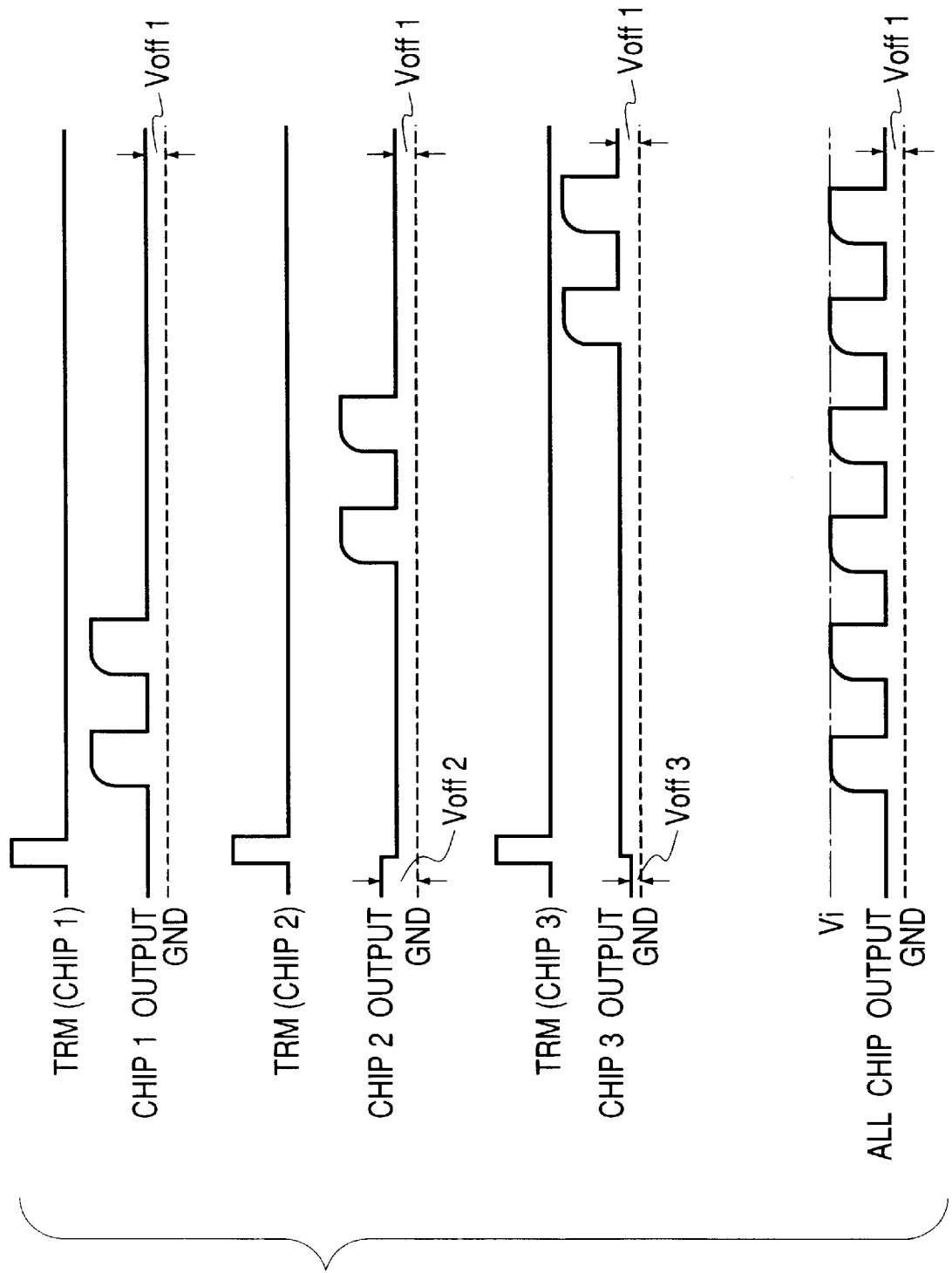
FIG. 3 is a timing chart for explaining the offset voltage correction processes of the signal processing apparatus of the present invention.

The operation of the image sensing unit with the above configuration will be described below with reference to the timing chart of FIG. 3.

For the sake of simplicity, assume that the photoelectric conversion of the respective chips has ended, and signals of the respective pixels have already been read out to the holding capacitors C1 to C6.

Prior to the output from the first chip, control terminals RST1 to RST3 of the reset means M5, M10, and M15 are set at high level to turn on the reset means M5, M10, and M15. In this fashion, the output lines L1 to L3 of the first to third chips are set at a reference level (GND in FIG. 3), so that the voltages corresponding to the reference level are output to the output terminals of the buffer means B1 to B3. After that, a pulse is input to a terminal TRM to turn on the feedback loop of the output system. At this time, of chip selection terminals S1 to S3, the pulse is input to the chip selection terminal S1 alone to turn on the is switch means SW1, and other switch means SW2 and SW3 are kept OFF.

In this way, an offset voltage Voff1 produced upon resetting the output line L1 of the chip 1 is supplied to one input terminal of each of the comparators WC1, WC2, and WC3 of all the chips 1, 2, and 3.

In the chip 1, the output from the output buffer B1 and the offset voltage Voff1 output via the switch means SW1 are compared by the comparator WC1. In the chip 1, if the two inputs of the comparator WC1 have no difference, the holding means holds a voltage corresponding to the offset voltage Voff1, thus immediately stabilizing the feedback loop (A1, R2, B1, SW1, WC1, M16, C7, R7, M17, R1).

In the chip 2 or 3, the offset voltage Voff1 of the chip 1 is input to one of the two input terminals of the comparator WC2 or WC3 via the terminal 8 or 9. The other input terminal receives an offset voltage Voff2 or Voff3 unique to the chip produced upon resetting the output line L2 or L3 in the chip.

More specifically, the comparator WC2 (WC3) compares the offset voltage Voff1 of the chip 1 with the offset voltage Voff2 (Voff3) of the chip 2 (or chip 3). When these voltages are different, the holding capacitor C8 is re-charged by the output from the comparator, and a voltage obtained by amplifying the voltage held in the capacitor is fed back as an input reference voltage of the differential amplifier A2 or A3.

As a consequence, the reference voltages of the differential amplifiers A1 to A3 converge to a given value when the output offset voltages of the respective chips have become equal to the offset voltage of the first chip. After that, an OFF pulse is supplied to the terminal TRM to turn off the transistors M16, M18, and M20. The time required until the feedback loop stabilizes is determined by the circuit time constant of the feedback loop, and it is not difficult to set the time within 1 $\mu$sec. Hence, driving using the feedback loop system of this embodiment can be done with practically no problems.

In this manner, the holding capacitors C7, C8, and C9 respectively hold voltages based on the offset voltage of the chip 1.

Therefore, when the scanning circuits are driven and the output signals of the photoelectric conversion elements of the respective chips are amplified by the differential amplifiers A1 to A3, the input reference voltages of the differential amplifiers A1 to A3 have already been adjusted to a predetermined value on the basis of the offset voltage of the chip 1.

In this way, after ON pulses are applied to the terminals TRM to turn on the switch means M16, M18, and M20, the offset voltages of the respective chips become approximately equal to Voff1.

If the output from each signal source is, e.g., a voltage Vi, the output from the terminal OUT of this signal outputting apparatus can be adjusted to the voltage Vi.

To summarize, upon output of the output signals from the respective chips, ideal, offset voltage-corrected outputs can be obtained.

In this embodiment, offset correction errors is mainly traced back to, i.e., the offset voltage of the comparator. And it can be suppressed to several mV to ten-odd mV although they vary depending on the precision in the manufacturing process, and can be greatly improved as compared to the conventional three factors.

Furthermore, since the offset voltage does not depend on the amplifier gain, the S/N ratio can be improved by increasing the amplifier gain if the correction errors may pose problems.

In the above description, the offset voltages of the integrated circuit chips 2 and 3 are corrected based on the that of the chip 1. Alternatively, in the apparatus shown in FIG. 2, based on the offset voltage of the chip 2 or 3, those of the remaining chips can be corrected by changing the operations.

Initially, the reset means M5, M10, and M15 are turned on to reset the output lines L1, L2, and L3 to the reference potential. Pulses are simultaneously input to the chip selection terminals S1, S2, and S3 to turn on the switch means SW1, SW2, and SW3, thus commonizing the output lines of all the chips via the common output line 10. In this manner, the common input terminals of the comparators WC1, WC2, and WC3 of the respective chips receive the maximum value (peak value) or minimum value (bottom value) of the respective chip outputs. In each chip, the offset voltage unique to that chip is compared with the maximum value (or minimum value) to correct that offset voltage. The maximum or minimum value to be used as the common input value is determined depending on whether the output buffers B1, B2, and B3 comprise nMOS or npn transistors, or pMOS or pnp transistors.

When the comparators WC1 to WC3 are controlled to be active or inactive simultaneously with the ON/OFF control of the switches M16, M18, and M20, not only power savings but also an operation error prevention effect can be obtained.

As a reference voltage source for generating a reference voltage to be input to the amplifiers A1, A2, and A3, other amplifiers may be used in place of a source-follower circuit shown in FIG. 2.

(Second Embodiment)

Figure 4:
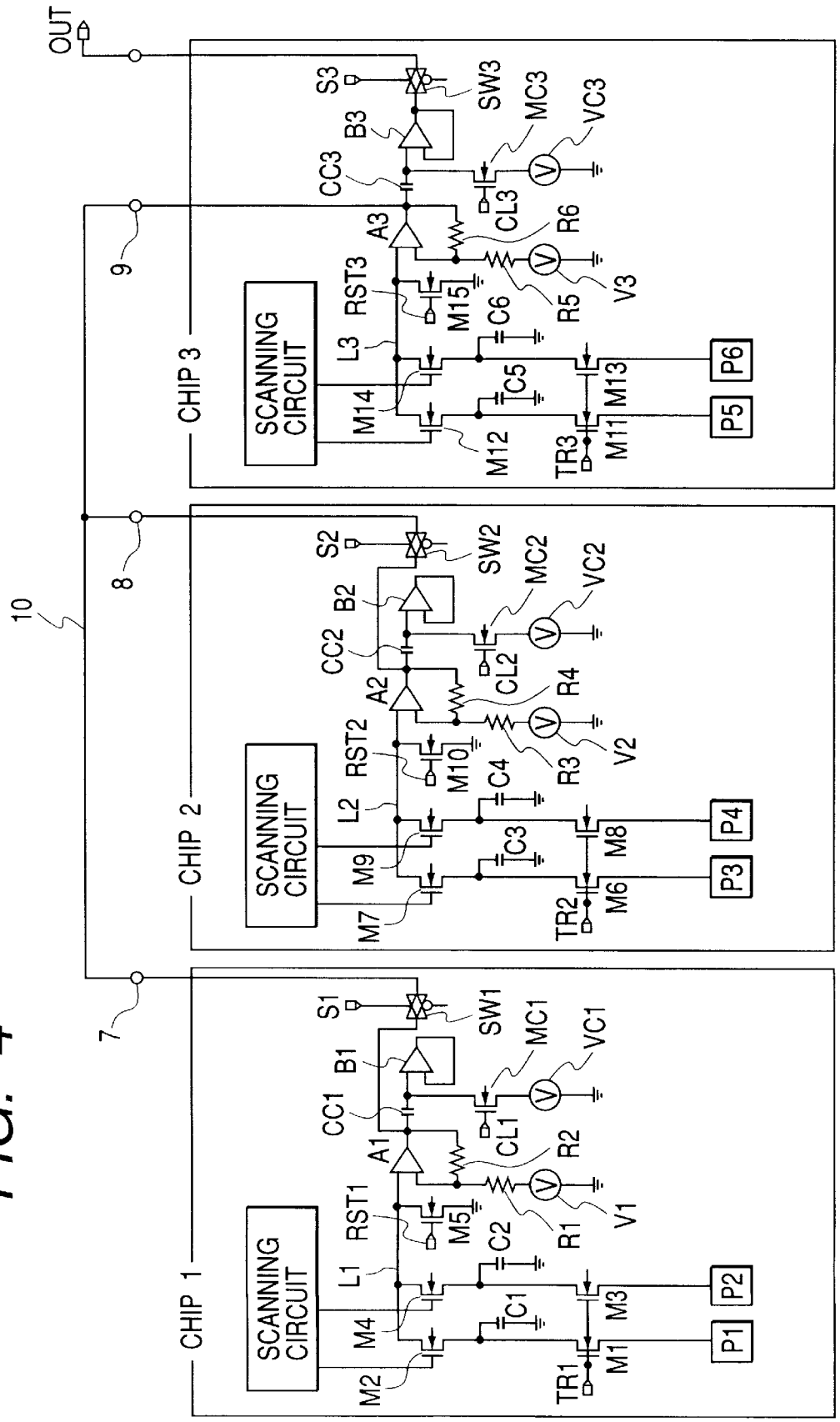
FIG. 4 is a circuit diagram showing the second embodiment of the present invention.

FIG. 4 shows another embodiment of the present invention.

In the circuit configuration of this embodiment, clamp means (clamp circuits) comprising capacitor means CC1 to CC3, switch means MC1 to MC3, and voltage sources VC1 to VC3 are respectively inserted between the amplifiers A1 to A3 and buffer means B1 to B3 of the chips 1 to 3 of the image sensing unit shown in FIG. 13, thereby correcting the offset voltages of the respective chips.

In the chips 1 and 2, the clamp means are bypassed, and the outputs from the amplifiers A1 and A2 are directly connected to the chip selection switch means SW1 and SW2, and are connected to the input terminal 9 (the input terminal of the capacitor means CC3) of the clamp means of the chip 3 via the output terminals 7 and 8 of the chips 1 and 2, and the common output line 10.

Hence, since the outputs from the amplifiers A1 and A2 of the chips 1 and 2 are output via the clamp means and buffer means B3 of the chip 3, offset voltages produced before the amplifier as well as that of the amplifier can be corrected by the clamp means (CC3, MC3, and VC3) of the chip 3.

Figure 5:
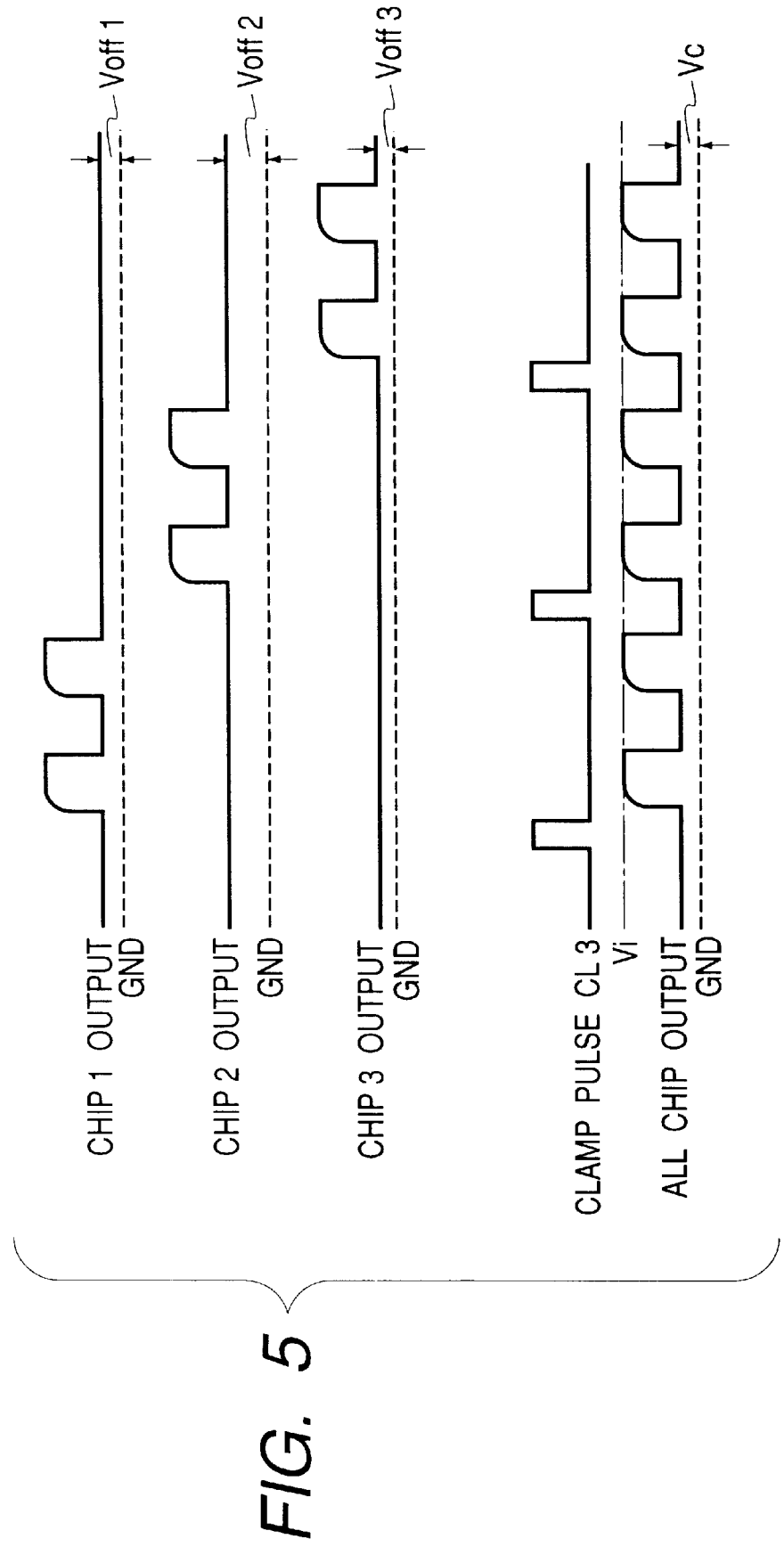
FIG. 5 is a timing chart for explaining the operation of the circuit shown in FIG. 4.

The operation of this embodiment will be briefly described below with reference to the timing chart in FIG. 5. When a pulse is input to a terminal CL3 of the clamp circuit of the chip 3 prior to the output timings of the respective chips, even when the output offset voltages (Voff1, Voff2, and Voff3) of the respective chips are different from each other, a waveform which is corrected for such offset differences is obtained at the terminal OUT. A voltage Vc is a reference voltage value corrected by clamping, and is determined depending on the voltage source VC3.

Figure 6:
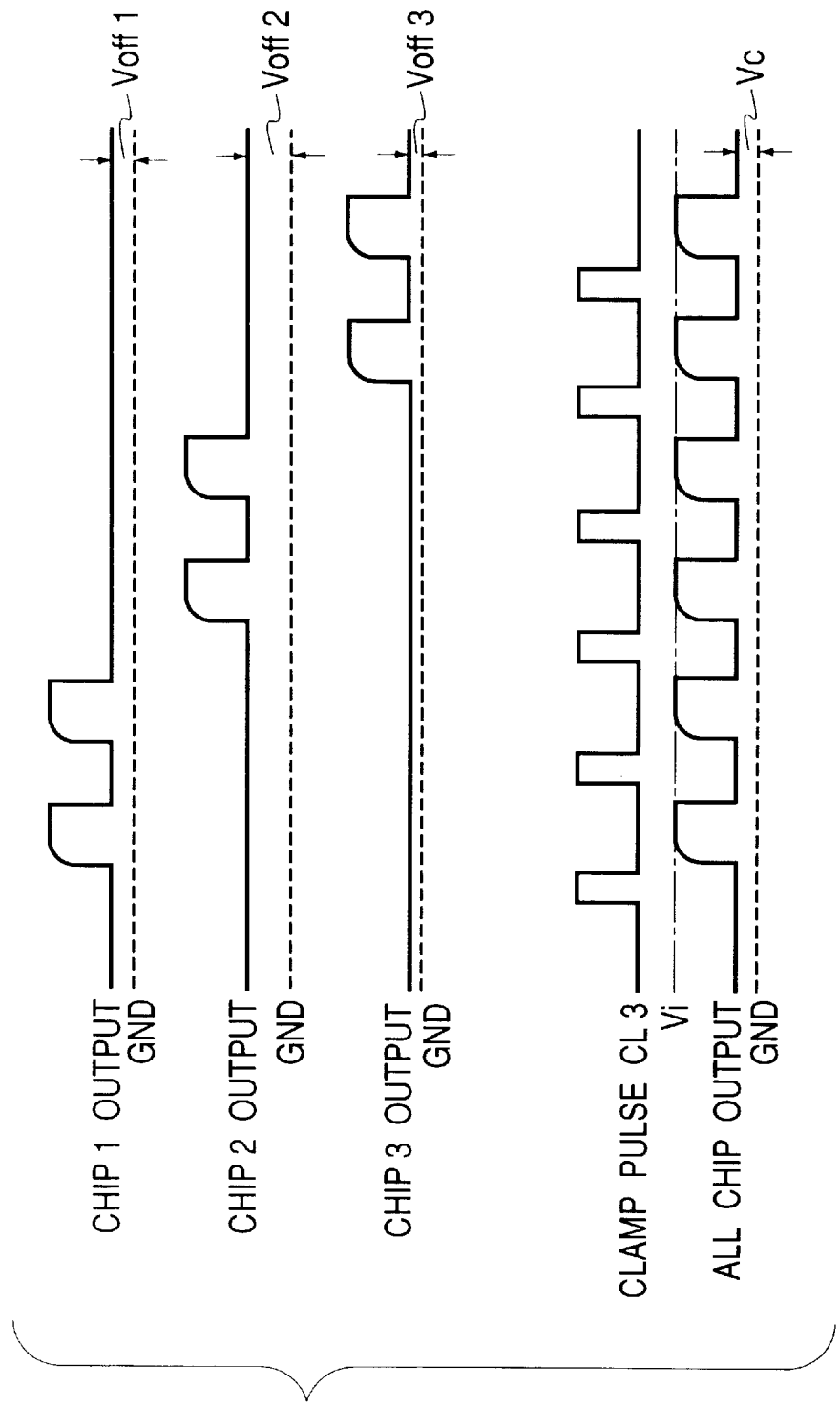
FIG. 6 is a timing chart for explaining the operation of the circuit shown in FIG. 4.

Alternatively, the clamp timings of the chip 2 may be determined in units of pixel outputs, as shown in the timing chart in FIG. 6.

In this case, the chip selection switch means SW3 of the chip 3 must be ON upon selecting all the chips. For this purpose, an OR gate can be connected to the terminal S3 so that the same pulse as that input to the terminals S1 and S2 is input to the terminal S3.

The signal outputting apparatus shown in FIG. 4 controls pulses to be input to the terminals S1, S2, and S3 in the individual chips. By contrast, in a signal outputting apparatus shown in FIG. 7, the terminals S1, S2, and S3 are disposed in the respective chips as external terminals, and the switches SW1, SW2, and SW3 are ON/OFF-controlled in response to a signal input from an external controller (not shown).

In the chip 3, by pulling up the external terminal S3 to the power supply voltage, the chip selection terminal S3 is set normally high, and the switch means SW3 is normally ON.

Since the output terminal of the amplifier A3 of the chip 3 is connected to the output terminals 7 and 8 of the remaining chips 1 and 2, an operational amplifier, the output of which floats when no signal output is made (in a non-selection state) is used as the one which constitutes the amplifier A3.

Chip selection pulses to be input to the chip selection pulse terminals S1 to S3 arranged in the chips are generated by timing generators TG1, TG2, and TG3 which are also arranged in the chips. In the chip 3, the output from the timing generator TG3 is directly connected to the control terminal of the switch means MC4 arranged at the output side of the amplifier A3, and is connected to the control terminal of the output switch means SW3 via a resistor RR to allow the input of an external control signal from an external terminal S3' at the same time. Hence, when the external terminal S3' is short-circuited to, e.g., the power supply, the switch SW3 becomes normally ON, but the switch MC4 is turned on upon reception of an ON pulse from the timing generator TG3 only when the chip 3 is selected.

Figure 8:
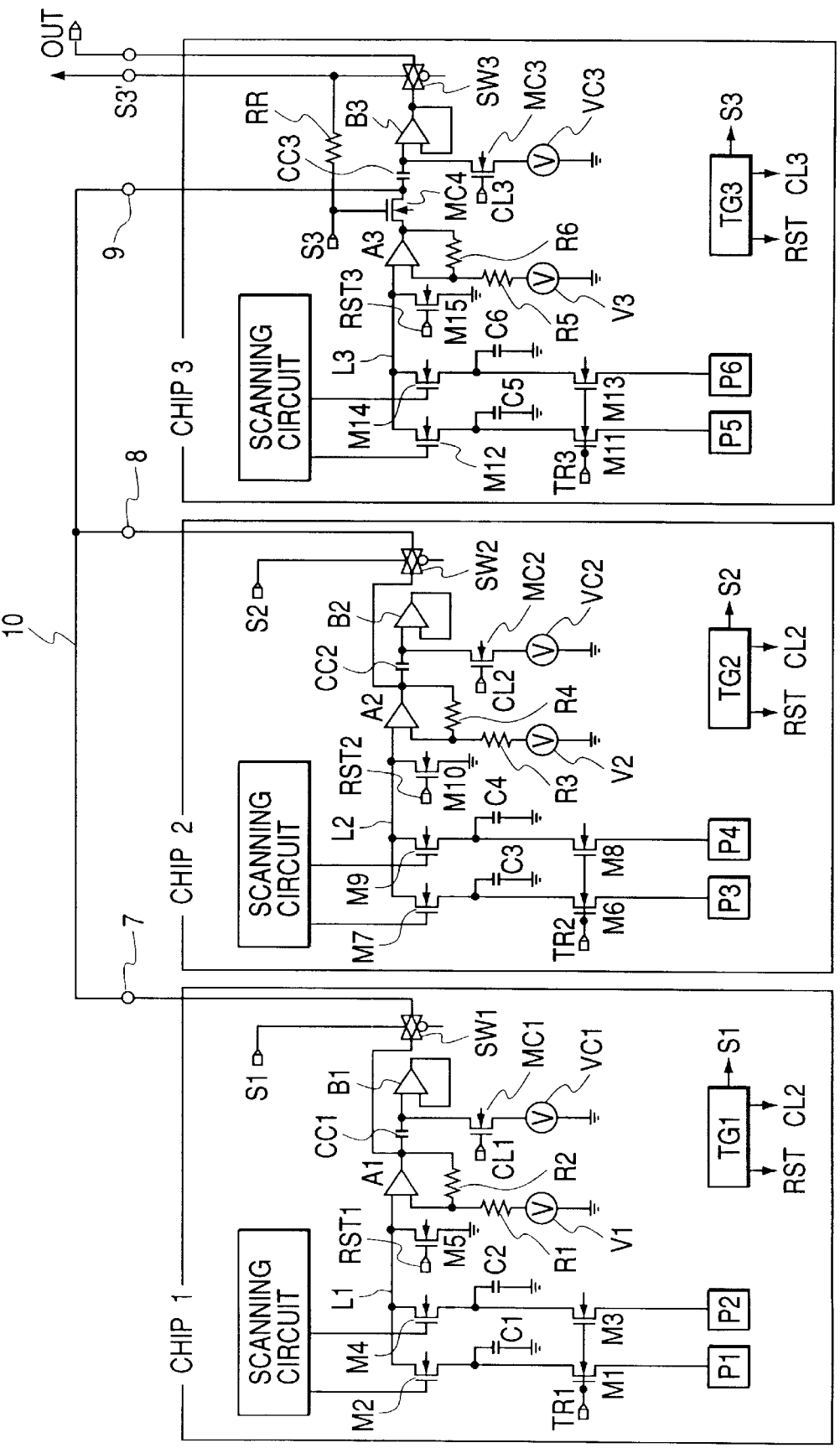
FIG. 8 is a circuit diagram showing another modification of the second embodiment of the present invention.

Of course, the terminals S1 and S3 in FIG. 8 may be arranged as external terminals of the chips.

Figure 7:
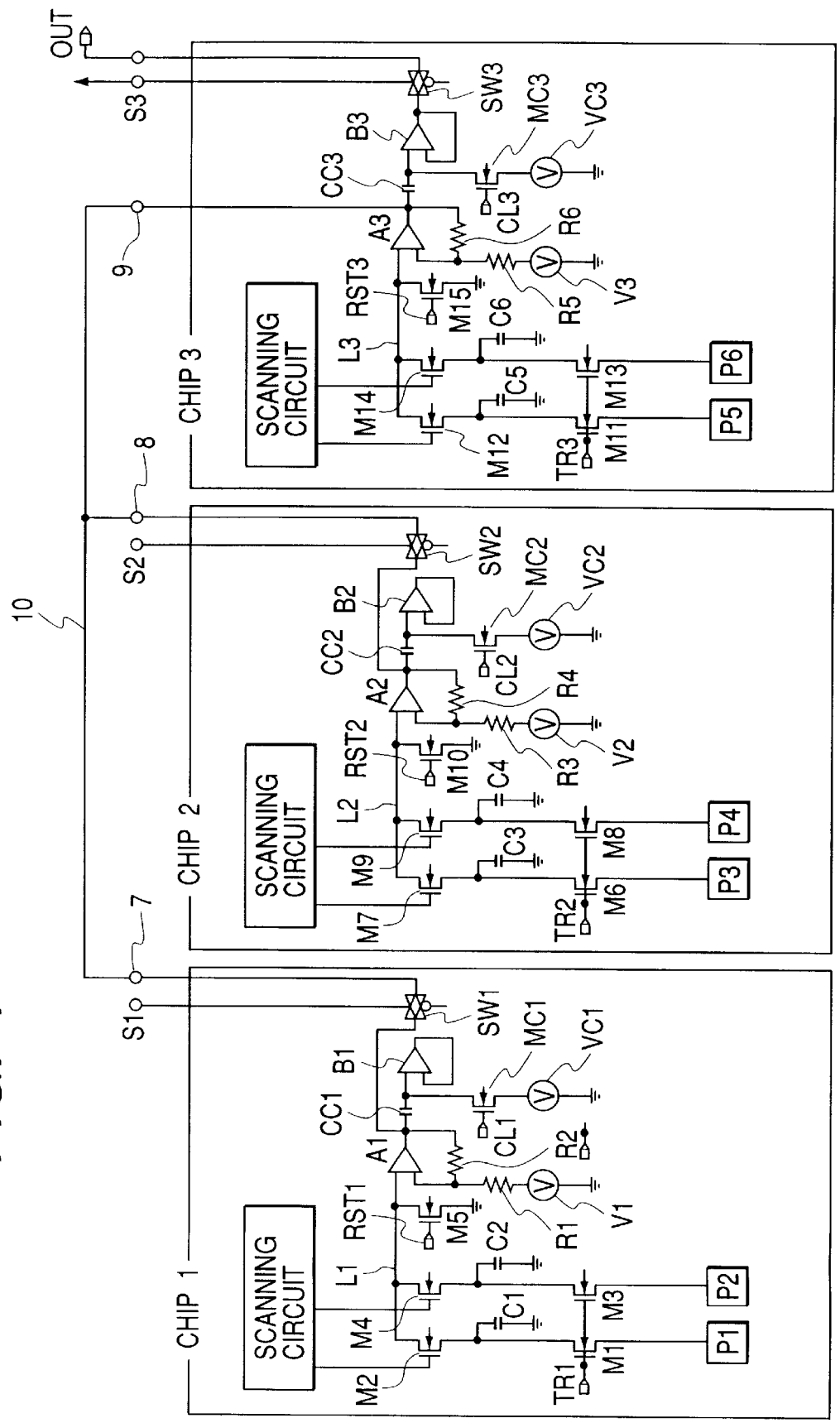
FIG. 7 is a circuit diagram showing a modification of the second embodiment of the present invention.

In the apparatuses shown in FIGS. 4, 7, and 8 described above, the chip 1 or 2, and the chip 3 have different circuit configurations, and the clamp circuits of the chips 1 and 2 are substantially in the halt state and not operative.

(Third Embodiment)

Figure 9:
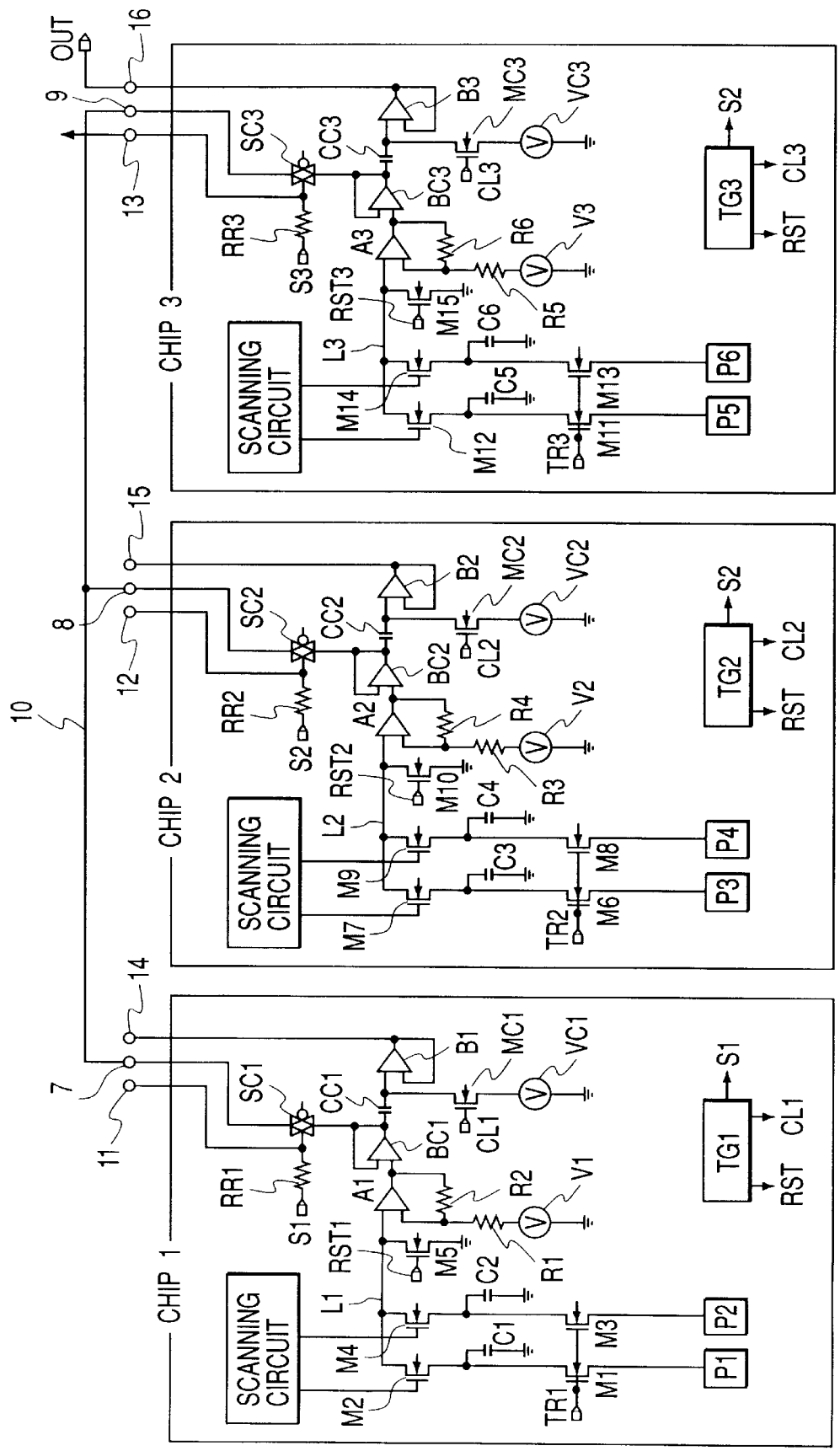
FIG. 9 is a circuit diagram showing a modification of the third embodiment of the present invention.

FIG. 9 shows the third embodiment of the present invention.

In the second embodiment, the chip 3 has an internal wiring pattern different from other chips, and must be prepared as a different chip, resulting in an increase in manufacturing cost.

In this embodiment, the chips 1 to 3 are the same ones, and the connection relationship among the chips is changed by the external wiring pattern of the chips.

The chips respectively have external output terminals 14, 15, and 16 from the clamp circuits, external output terminals 7, 8, and 9 for outputting non-corrected output signals, and external control terminals 11, 12, and 13 for determining the ON/OFF timings of the outputs/inputs from the chips.

In this case, since the clamp circuits of the chips 1 and 2 need not operate, the terminals 14 and 15 can be open or be fixed at a predetermined potential.

In FIG. 9, buffer means BC1 to BC3 and switch means SC1 to SC3 are arranged at the output side of the differential amplifiers A1 to A3, and chips with the same configuration are connected as the chips 1 to 3. The terminals 11, 14, 12, and 15 are open, and the terminal 13 is held at a high potential.

The operation of this embodiment will be explained below. When a pulse is input from the timing generator TG1 to the chip selection terminal S1 to turn on the switch means SC1 and to select the chip 1, the output from the amplifier A1 is output onto the common output line 10 via the buffer BC1 and switch means SC1.

Since the switch means SC3 is normally ON, the output signal from the chip 1 is input to the capacitor CC3 of the clamp circuit of the chip 3. The buffer B3 of the clamp circuit of the chip 3 outputs the output signal of the chip 1 with reference to the clamp potential determined by the voltage source VC3.

Hence, independently of any offset voltage components of the chip 1, the offset voltage can be corrected by the clamp circuit of the chip 3.

In this way, after all the output signals from the signal sources of the chip 1 are corrected and output from the output terminal OUT, the output signals from the chip 2 are similarly corrected by the clamp circuit of the chip 3 and are then output.

As described above, the apparatus in FIG. 9 allows any chip to clamp the output signals from other chips depending on the connections of the terminals 7, 8, 9, 11, 12, 13, 14, 15, and 16.

Hence, the chip 3 need not have an internal circuit configuration different from those of the chips 1 and 2.

Note that the buffer means BC1 to BC3 preferably select buffer circuits, the output terminals of which float when the corresponding chips are not selected, i.e., do not output any signals.

(Fourth Embodiment)

Figure 10:
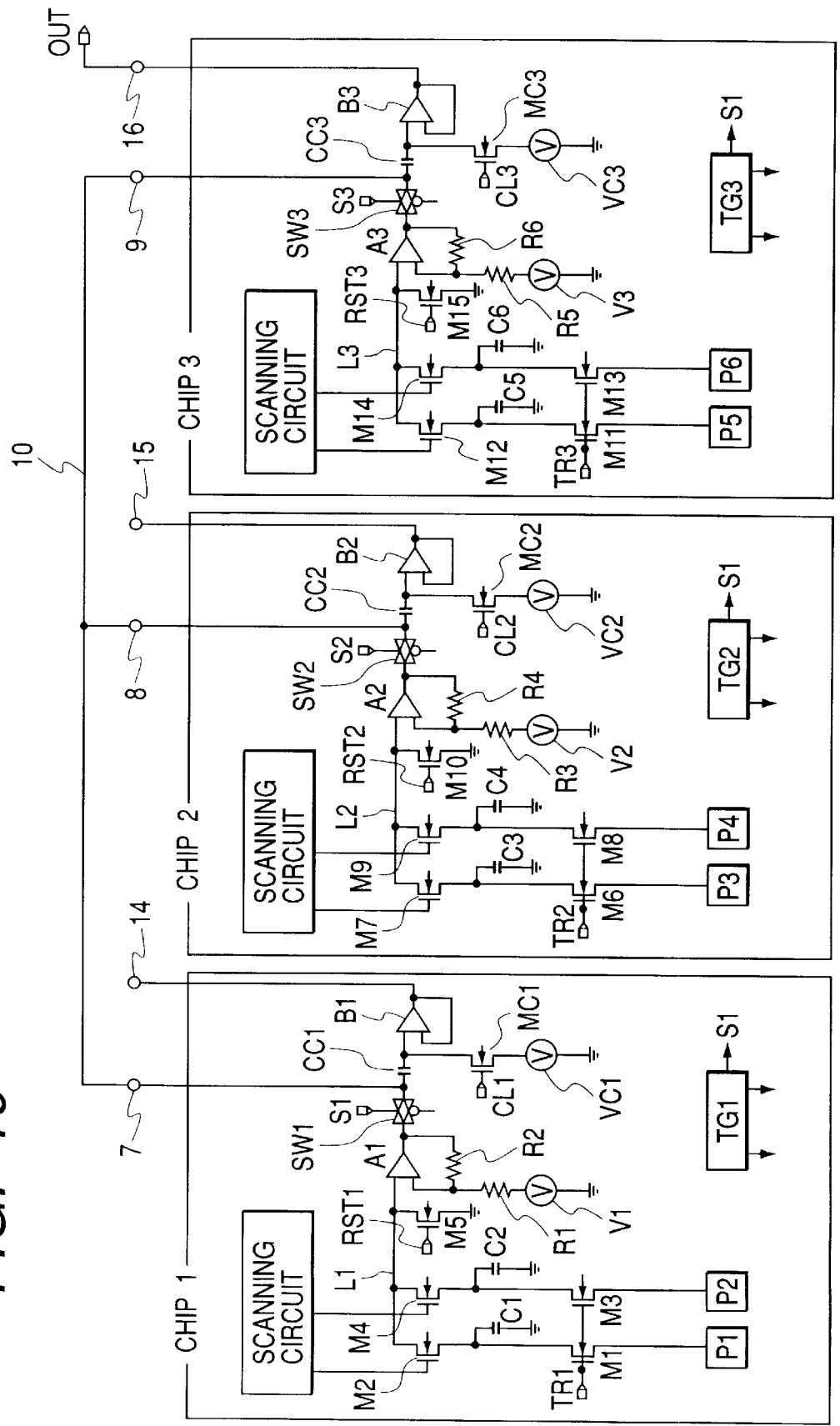
FIG. 10 is a circuit diagram showing a modification of the fourth embodiment of the present invention.

FIG. 10 shows the fourth embodiment of the present invention.

In this embodiment, all the chips have the same chip configuration without adding any new buffer means at the output side of the amplifiers A1 to A3. In the configuration of this embodiment, switch means SW1 to SW3 are respectively arranged at the output side of the amplifiers A1 to A3, and are controlled using chip selection pulses S1 to S3 generated by the internal timing generators TG1, TG2, and TG3 as in the prior art.

The outputs from the switch means SW1 to SW3 are temporarily output to external output terminals 7, 8, and 9 of the chips. The output buffer means B1 to B3 of the chips can output their contents outside the chips without the intervention of any switch means. However, the output terminals 14 and 15 of the chips 1 and 2 are open or held at a predetermined potential, and the outputs from these terminals 14 and 15 are ignored.

According to this embodiment, when the chip 1 is selected, the output from the chip 1 is input to the clamp capacitor CC3 of the chip 3 via the amplifier A1 and switch means SW1. The clamp capacitor CC3 removes offset voltage components due to the amplifier A1 and the like of the chip 1, and the output signal of the chip 1 is then output from the terminal OUT via the buffer means B3. The same applies to the chips 2 and 3. According to the present invention, a multi-chip type signal outputting apparatus free from any offset voltage among chips can be obtained with low cost.

(Fifth Embodiment)

Figure 11:
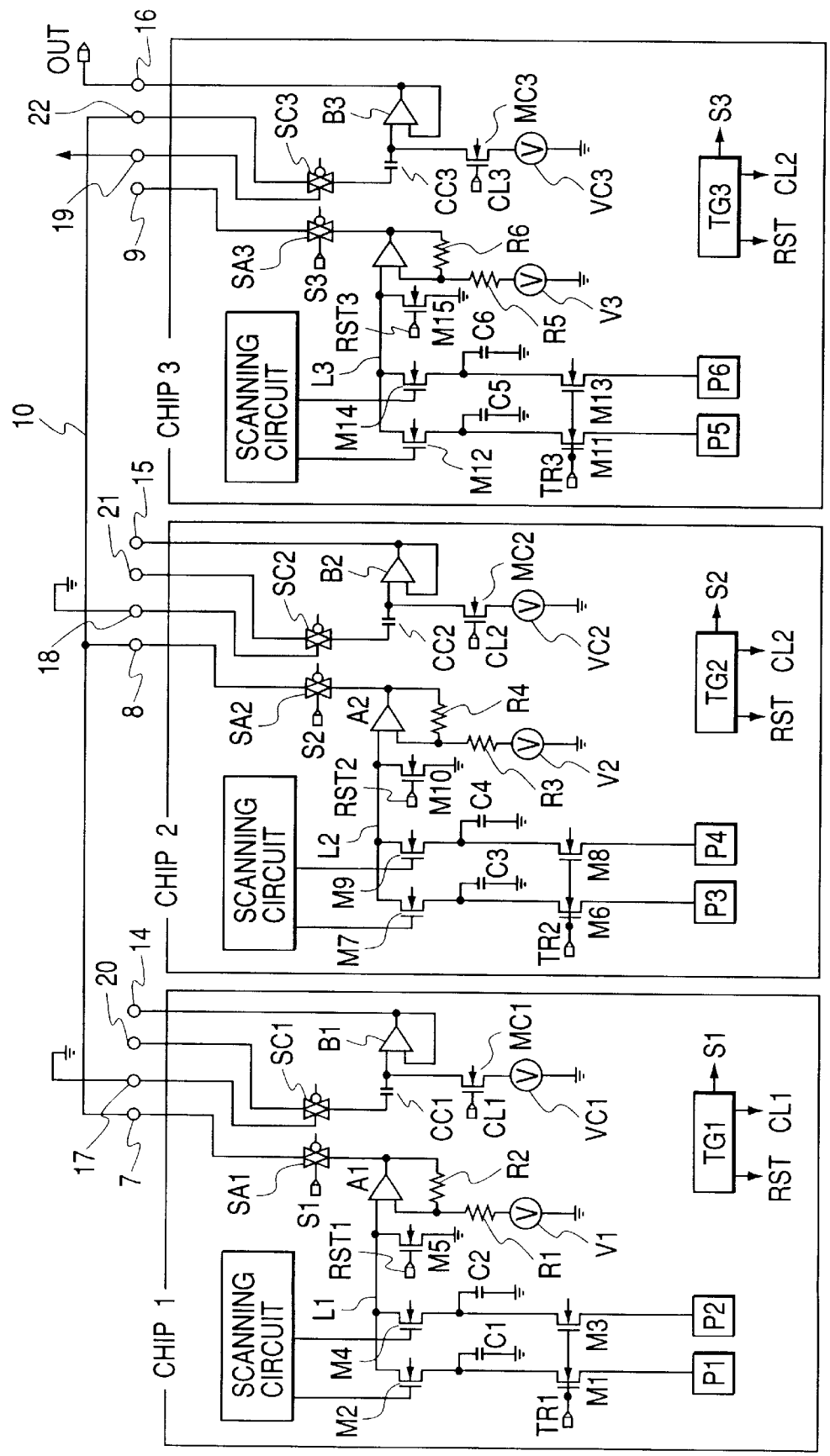
FIG. 11 is a circuit diagram showing a modification of the fifth embodiment of the present invention.

FIG. 11 shows the fifth embodiment of the present invention.

In this embodiment, the outputs from the amplifiers A1, A2, and A3 are completely isolated from the inputs of the clamp circuit, and switch means SA1, SC1, SA2, SC2, SA3, and SC3 are arranged in the respective chips. According to this embodiment, the output terminal of the amplifier of the non-selected chip need not float. The outputs from the amplifiers A1 to A3 are output to the terminals 7, 8, and 9 via the switch means SA1 to SA3, respectively.

The terminals 7, 8, and 9 are connected to the common output line 10. Also, the common output line is connected to an input terminal 22 of the clamp circuit of the chip 3.

Control input terminals 17 and 18 of the clamp input switches SC1 and SC2 of the chips 1 and 2 are kept pulled down to set the switches SC1 and SC2 in the normally OFF state. A control input terminal 19 of the chip 3 is pulled up to high potential, and the switch SC3 is set in the normally ON state.

An input terminal 20 and output terminal 14 of the clamp circuit of the chip 1, and an input terminal 21 and output terminal 15 of the clamp circuit of the chip 2 are respectively open or fixed at a predetermined potential.

Signals from the signal sources P1 to P6 are accumulated on the holding capacitors C1 to C6 by turning on the transfer switches M1, M3, M6, M8, M11, and M13.

When a start pulse is input from a controller (not shown) to the chip 1, the timing generator TG1 generates a pulse for resetting the output line L1, and inputs it to the terminal RST of the reset means R5. In this way, the output line L1 is reset.

After the output line L1 is reset, the scanning circuit turns on the switch means M2 and M4 in turn, and time-serially outputs the signals accumulated on the holding capacitors C1 and C2 onto the output line L1. Then, these signals are amplified by the amplifier A1, and are then output onto the common output line 10 via the ON switch S1.

The output signals from the chip 1 are input to the terminal 22, and are then input to the switch means SC3 of the clamp circuit of the chip 3. Upon operation of the clamp circuit, offset voltage components unique to the chip 1 are practically removed, and the signals from the chip 1 are output from the output terminal OUT as signals with predetermined offset voltage components (clamp voltage components).

At this time, the switch means SA3 is OFF.

Upon completion of the signal output operation from the chip 1, the chip 1 outputs an end signal via a terminal (not shown). When the end signal is input to the chip 2, the chip 2 turns on the switch means SA2 to start signal output. Since the operation of the chip 2 is the same as that of the chip 2, the output signals from the chip 2 are input to the clamp circuit of the chip 3. The clamp circuit of the chip 3 essentially removes offset voltage components unique to the chip 2 included in the output signals from the chip 2. In this way, the signals from the chip 2 are output from the output terminal OUT as signals containing clamp voltage components of the chip 3.

In each of the above embodiments, the chips are connected so that all the signals are output from the chip 3. However, the output can be extracted from an arbitrary chip using an external line.

In each of the above embodiments, the linear signal outputting apparatuses are connected in series, but two-dimensional signal outputting apparatuses may be connected in series or parallel.

Furthermore, in each of the above embodiments, the signal outputting apparatus has one output terminal per chip. Alternatively, when each chip has a plurality of output terminals, the chips can be similarly connected.

The control terminal (gate) of each switch means may be ON/OFF-controlled by a signal supplied outside the chip or may be controlled by the internal timing generator of the chip.

Figure 12A:
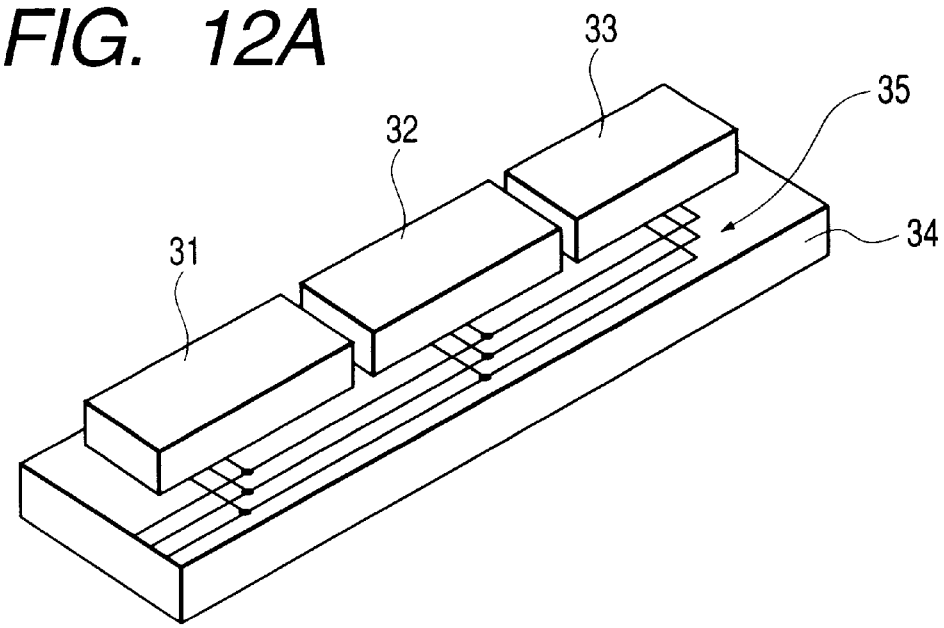
FIGS. 12A and 12B are perspective views showing the outer appearances of a signal outputting apparatus of the present invention.
Figure 12B:
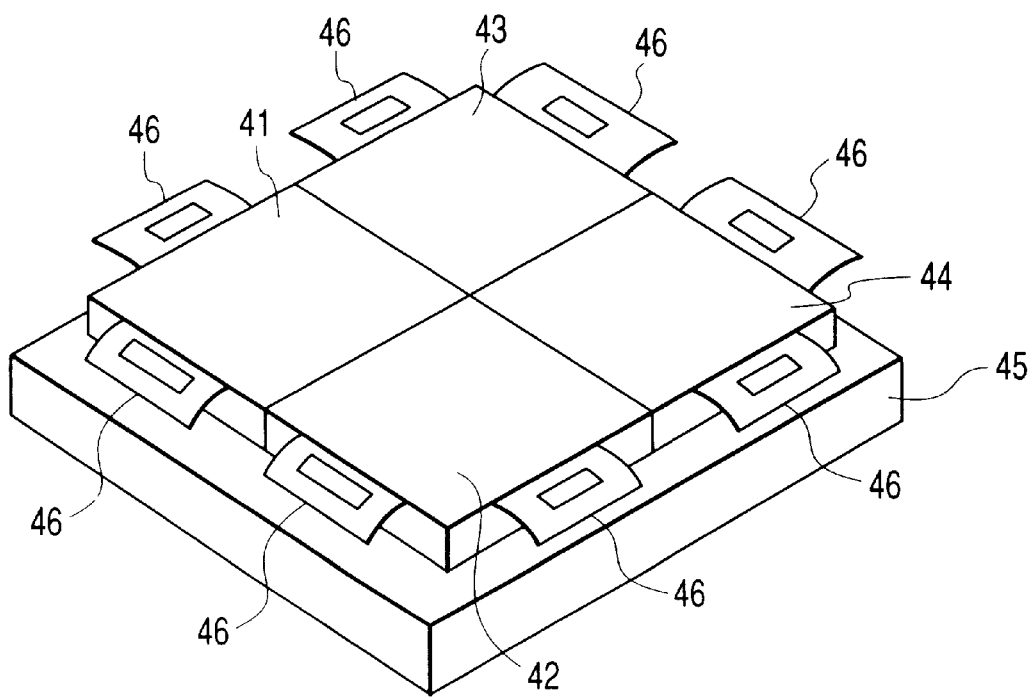

FIGS. 12A and 12B show examples of the signal outputting apparatus of the present invention. FIG. 12A shows the outer appearance of an assembly obtained by linearly mounting integrated circuit chips 31 to 33 on a support member 34. Wiring 35 is formed on the support member 34, and is connected to the external terminals of the chips 31 to 33 by wire or flip-chip bonding.

FIG. 12B shows the outer appearance of an assembly obtained by two-dimensionally mounting integrated circuit chips 41 to 44 on a support member 45.

TAB film carrier package ICs 46 are connected to the chips 41 to 44. When each of the integrated circuit chips 41 to 44 comprises a thin film integrated circuit formed on a glass or quartz substrate, it has a size as large as 10,000 mm$^2$ although it is called a "chip".

Offset voltage variations of the chips 31 to 33 (41 to 44) are corrected by a correct circuit in one chip.

To recapitulate, according to the signal outputting apparatus of the present invention, when the integrated circuit chips produce outputs, offset voltage-corrected outputs can be obtained.

More specifically, even when the respective chips have different offset voltages of their output signals, the offset voltage differences can be suppressed. Hence, when the present invention is applied to, e.g., an image sensor, a multi-chip type image sensor unit that can output an image with quality as high as that of an original image can be provided.

What is claimed is:

1. A signal outputting apparatus that connects a plurality of integrated circuit chips each having a plurality of signal sources and an output terminal for outputting output signals from said signal sources,
   wherein each of the integrated circuit chips comprises a correct circuit for reducing a difference among offset voltages of the output signals from said integrated circuit chips, and
   an offset signal of any one of said integrated circuit chips is input to all others of the plurality of integrated circuit chips, and correction is performed in each chip on the basis of the offset signal.

2. An apparatus according to claim 1, wherein said correct circuit comprises a comparator which is connected to the output terminal of the integrated circuit chip different from the integrated circuit chip with said correct circuit, and compares an input signal from said output terminal and an output signal from said integrated circuit chip with said correct circuit.

3. A signal outputting apparatus that connects a plurality of integrated circuit chips each having a plurality of signal sources and an output terminal for outputting output signals from said signal sources, wherein one of said plurality of integrated circuit chips comprises a correct circuit for reducing a difference among offset voltages of the output signals from said integrated circuit chips, and said chip comprising said correct circuit is input with outputs of all of the other integrated circuit chips, whereby the corrected output signal is obtained from said correct circuit.

4. An apparatus according to claim 3, wherein said correct circuit includes a clamp circuit, and output signals from all the integrated circuit chips are input to said clamp circuit.

5. An apparatus according to claim 4, wherein said clamp circuit clamps once before all the integrated circuit chips output the output signals or once before each integrated circuit chip outputs the output signal.

6. An apparatus according to claim 1, wherein circuits having the same configuration as said correct circuit are arranged on all the integrated circuit chips, and at least one of the circuits serves as said correct circuit on the basis of operations of the respective integrated circuit chips.

7. An apparatus according to claim 3, wherein each integrated circuit chip comprises a timing generator for determining an output timing of an output signal to the output terminal.

8. An apparatus according to claim 3, wherein each integrated circuit chip comprises an amplifier for amplifying an output signal from the corresponding signal sources, and said amplifier in the integrated circuit chip with said correct circuit is configured to have an output terminal in a normally floating state.

9. An apparatus according to claim 8, wherein said amplifier in the integrated circuit chip with said correct circuit realizes the normally floating state by connecting a normally OFF switch to an output terminal thereof.

10. An apparatus according to claim 3, wherein the respective integrated circuit chips have an identical circuit configuration, and the chip which serves as said correct circuit is determined on the basis of connections among the integrated circuit chips.

11. An apparatus according to claim 3, wherein each integrated circuit chip comprises a circuit which can serve as said correct circuit independently of said signal sources and output terminal, and at least one of said circuits serves as said correct circuit on the basis of connections among the integrated circuit chips.

12. An apparatus according to claim 3, wherein said integrated circuit chips are mounted on a single substrate, and the integrated circuit chip mounted on an end portion has said correct circuit.

13. An apparatus according to claim 3, wherein said correct circuit has a terminal for receiving output signals from the integrated circuit chips different from the integrated circuit chip with said correct circuit.

14. An apparatus according to claim 1, wherein an output circuit stage for outputting signals from said signal sources of each integrated circuit chip has a feedback system comprising a comparator, signal holding means, and amplifier means.

15. An apparatus according to claim 14, wherein said comparator of said feedback system for one integrated circuit chip receives output signals from other integrated circuit chips.

16. An apparatus according to claim 14, wherein output signals from the integrated circuit chips are output via the output circuit stage of at least one of said plurality of integrated circuit chips.

17. An apparatus according to claim 16, wherein the output circuit stage has a clamp circuit.

18. An apparatus according to claim 1 or 3, wherein said signal sources comprise photoelectric conversion elements.

19. An apparatus according to claim 1, wherein each chip is provided with chip selection terminals and said offset signal is a signal output from one chip selected by inputting a pulse to one of the chip selection terminals.

20. An apparatus according to claim 1, wherein said offset signal corresponds to the maximum value or the minimum value among the offset signals output from all the chips.

21. An apparatus according to claim 3, wherein circuits having the same configuration as said correct circuit are arranged on all the integrated circuit chips, and at least one of the circuits serves as said correct circuit on the basis of operations of the respective integrated circuit chips and/or connections among the respective integrated circuit chips.

* * * * *

UNITED STATES PATENT AND TRADEMARK OFFICE
CERTIFICATE OF CORRECTION

PATENT NO. : 6,002,287

DATED : December 14, 1999

INVENTOR(S) : ISAMU UENO ET AL.

It is certified that error appears in the above-identified patent and that said Letters Patent is hereby corrected as shown below:

ON THE COVER PAGE:

Item [56], References Cited, in FOREIGN PATENT DOCUMENTS:

"4-113766 5/1992" should read --4-113766 4/1992--.

COLUMN 2

Line 28, "it may be read the image" should read --it may read the image--; and
    Line 61, "invention." should read --invention;--.

COLUMN 3

Line 44, "at;least" should read --at least--.

COLUMN 4

Line 59, "chip" should read --chips--.

COLUMN 7

Line 11, "errors" should read --error--;
    Line 22, "the that" should read --that--; and
    Line 24, "chip" should read --chips--.

UNITED STATES PATENT AND TRADEMARK OFFICE
CERTIFICATE OF CORRECTION

PATENT NO. : 6,002,287

DATED : December 14, 1999

INVENTOR(S) : ISAMU UENO ET AL.

It is certified that error appears in the above-identified patent and that said Letters Patent is hereby corrected as shown below:

COLUMN 8

Line 58, "chip" should read --chips--.

Signed and Sealed this

Twenty-seventh Day of March, 2001

Attest:

NICHOLAS P. GODICI

*Attesting Officer*    Acting Director of the United States Patent and Trademark Office